Dec. 26, 1950 R. R. YOST, JR 2,535,340
SINGLE SIDE BAND MODULATOR
Filed Nov. 27, 1945 2 Sheets-Sheet 1

INVENTOR.
RUSSELL R. YOST JR.
BY
*William D. Hall.*
ATTORNEY

Dec. 26, 1950 — R. R. YOST, JR — 2,535,340
SINGLE SIDE BAND MODULATOR
Filed Nov. 27, 1945 — 2 Sheets—Sheet 2

*INVENTOR.*
RUSSELL R. YOST JR.
BY William D. Hall
*ATTORNEY*

Patented Dec. 26, 1950

2,535,340

UNITED STATES PATENT OFFICE 2,535,340

SINGLE SIDE BAND MODULATOR

Russell R. Yost, Jr., Port Washington, N. Y., assignor to the United States of America as represented by the Secretary of War Application November 27, 1945, Serial No. 631,180

5 Claims. (Cl. 332—45)

This invention relates to electrical circuits and more particularly to a type of circuit known as a single-sideband modulator circuit.

It is often desirable to produce a signal that differs in frequency by a predetermined amount from a given signal. One use of a circuit that produces such a signal is in testing relative-velocity measuring devices or any radio devices which depend upon the Doppler effect for their operation. These devices are responsive to the changed frequency of a reflected received signal compared with the frequency of an emitted signal. Elaborate signal generators have in the past been used to test the above mentioned Doppler effect devices, but their construction involves driven mechanical components for developing the equivalent of the reflected waves. Such test generators are relatively inflexible in use since they can be designed for operation over only a restricted range of radio frequencies and of relative velocities. It has also been proposed to use an ordinary oscillator operating at a known frequency which differs by any necessary amount from that of the signal emitted by the device to be tested. The tendency of such an oscillator and its device to shift their frequencies towards coincidence has prevented successful application of this principle where those frequencies are even moderately close to each other.

A second application of a circuit for performing the above mentioned operation is in radio modulator circuits where it is desirable to obtain only a single sideband from the combination of a carrier frequency signal and a modulating signal. In the past the separation of one sideband from the second sideband and carrier frequency has been performed by the use of tuned circuits having very sharp frequency response characteristics. It is impossible, however, to provide tuned circuits with sufficiently sharp frequency response characteristics to separate two frequencies that are very close together, for example, a signal of 100 megacycles and a second signal of 100 megacycles plus 20 cycles.

It is an object of the present invention, therefore, to provide a circuit for producing a signal that differs in frequency by a predetermined amount from a given signal.

It is a further object of this invention to provide a modulator circuit that is capable of providing a signal, the frequency of which is equal to the sum or the difference of two frequencies whichever may be desired.

A third object of this invention is to provide a modulator circuit in which the amplitude of the carrier frequency and at least one of the sidebands may be adjusted at any value including zero.

In accordance with the present invention there is provided a plurality of means for modulating a given signal with a second signal. Means are provided for shifting the phase of the two above mentioned signals and for amplifying the first mentioned signal by any desired amount. Means are also provided for combining the outputs of the modulating means and said amplifying means whereby a signal having a frequency equal to the sum or difference of the frequencies of the two above mentioned signals is obtained.

For a better understanding of the invention, together with other and further objects thereof, reference is had to the following description taken in connection with the accompanying drawing in which.

Figure 1:
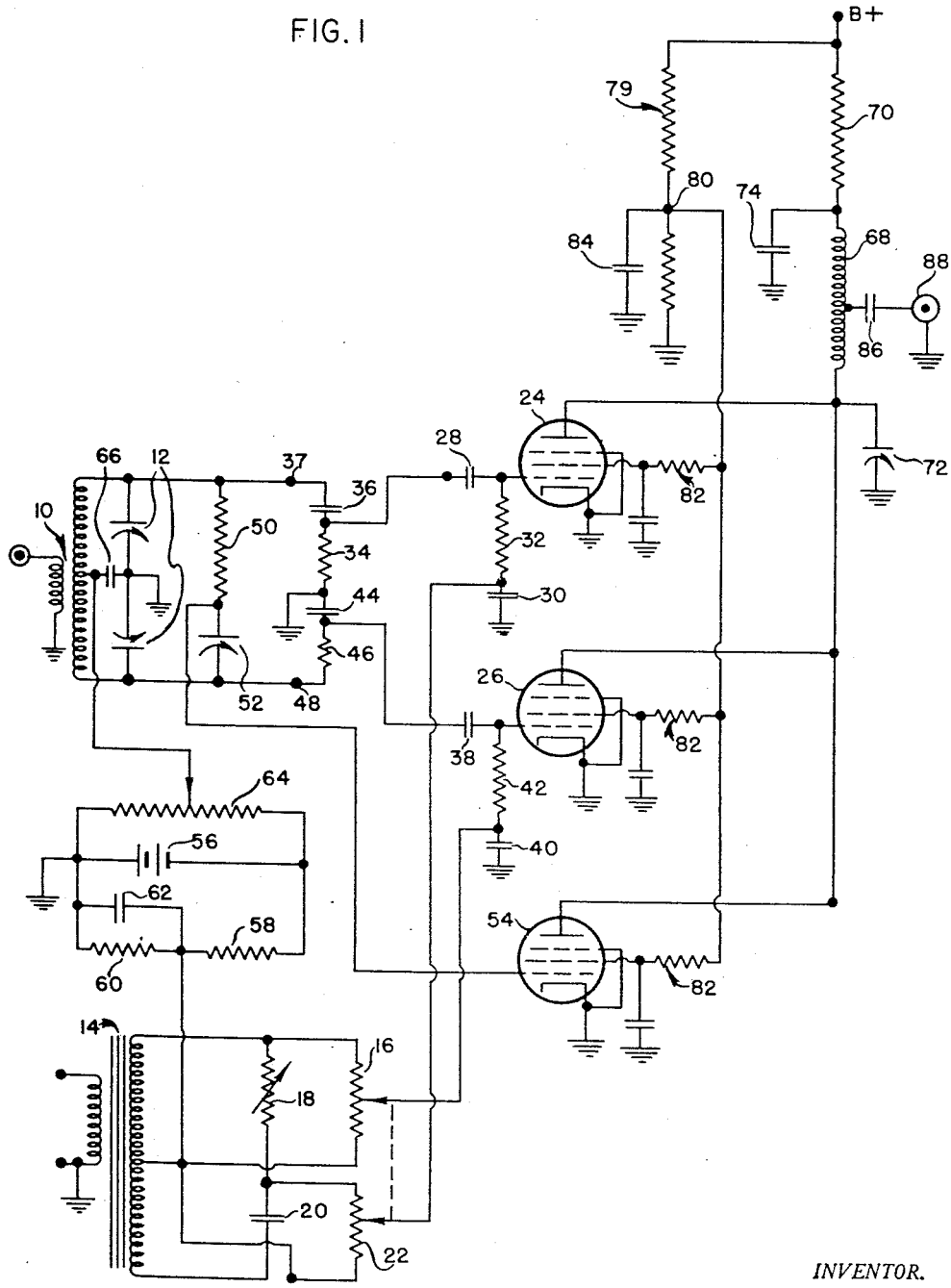
Fig. 1 is a wiring diagram of one embodiment of the present invention.

In Fig. 1 a signal $f_c$ from any source (not shown) of a predetermined frequency is applied to the input transformer 10, the secondary of which is tuned by split capacitor 12. A modulation signal $f_m$ is obtained from a suitable source (not shown) and app'ied to the circuit through transformer 14. Half of the voltage across the secondary transformer 14 is applied to a potentiometer 16. A phase shifter comprising variable resistor 18 and capacitor 20 is connected across the entire secondary of transformer 14. A potentiometer 22 similar to potentiometer 16 is connected between the junction of resistor 18 with capacitor 20 and the center-tap of the transformer 14. The tap on potentiometer 22 is mechanically coupled to the tap on potentiometer 16 in such a manner that moving the tap on potentiometer 22 to a point of greater signal amplitude moves the tap on potentiometer 16 to a point of lesser signal amplitude.

The signal $f_c$ is modulated by signal $f_m$ in two modulator tubes 24 and 26. A resistive-capacitive coup'ing network comprising capacitors 28 and 30 and resistor 32 is provided for applying both signals $f_c$ and $f_m$ to the control grid of tube 24. Capacitors 28 and 30 have substantially zero impedance to the signal $f_c$ and substantially infinite impedance to the signal $f_m$. The voltage at the frequency $f_c$ that is applied to the grid of tube 24 is developed across resistor 32 while the voltage of a frequency $f_m$ is developed across capacitor 30. Capacitor 28 prevents the signal $f_m$ from appearing at transformer 10 and capacitor 30 prevents the signal $f_c$ from appearing at transformer 14. The tap on potentiometer 22 is connected to the junction of resistor 32 and capacitor 30. A resistor 34 and a capacitor 36 so chosen that the impedances presented to signal $f_c$ by the two elements are substantially equal are connected between ground and one terminal 37 of the secondary of transformer 10. The junction of resistor 34 and capacitor 36 is connected to the control grid of tube 24 through capacitor 28. A resistive-capacitive network comprising capacitors 38 and 40 and resistor 42 is provided for coupling the signals $f_c$ and $f_m$ to the control grid of tube 26. The tap on potentiometer 16 is connected to the junction of resistor 42 and capacitor 40. The series combination of a capacitor 44 and a resistor 46 is connected between ground and terminal 48 of transformer 10. Again capacitor 44 and resistor 46 are so chosen that their impedances at the frequency of signal $f_c$ are substantially equal. The junction of resistor 46 and capacitor 44 is connected through capacitor 38 to the control grid of tube 26.

A phase shifter comprising resistor 50 and variable capacitor 52 is connected between terminals 37 and 48 of transformer 10. The junction of resistor 50 and capacitor 52 is connected to the control grid of a vacuum tube 54. Vacuum tube 54 as well as vacuum tubes 24 and 26 are preferably of the pentode type and preferably have a high plate impedance to prevent cross modulation of the signals from the three tubes. The cathodes of tubes 24, 26, and 54 are all connected to ground, and in each tube the suppressor grid is directly connected to the cathode. A source of direct current potential illustrated schematically by battery 56 with resistors 58 and 60 connected between the positive and negative terminals of battery 56 provide a fixed bias for the control grids of tubes 24 and 26. This bias is applied to these tubes by connecting the junction of resistors 58 and 60 to the center tap of the secondary of transformer 14. The positive terminal of battery 56 is connected to ground and resistor 60 is shunted by a capacitor 62 so that the junction of resistor 58 and resistor 60 is at ground potential for both signals $f_c$ and $f_m$. A variable bias is applied to the control grid of tube 54 by connecting a potentiometer 64 between the positive and negative terminals of battery 56. A movable tap on potentiometer 64 is connected to the center tap of the secondary of transformer 10. The center tap of transformer 10 is connected to ground for all of the alternating current signals by a capacitor 66. The anodes of tubes 24, 26, and 54 are connected together and to a source of positive potential through a coil 68 and a resistor 70. Coil 68 is tuned to resonate at the frequency of the desired output signal by a variable capacitor 72. The junction of resistor 70 and coil 68 is connected to ground through a capacitor 74. Resistor 70 and capacitor 74 form a type of conventional decoupling filter. A positive potential supply for the screen grids of tubes 24, 26 and 54 is provided by means of a voltage divider 79 connected from B+ to ground. The screen grid of each of these three tubes is connected to the center tap 80 of this potential divider through a conventional resistive-capacitive decoupling network 82, as shown in Fig. 1. The center tap 80 of voltage divider 79 is maintained at ground potential for alternating current signals by means of a capacitor 84. A tap on coil 68 connected through a capacitor 86 to an output terminal 88 provides means for obtaining a signal from this circuit.

The operation of the circuit of Fig. 1 may best be understood by reference to Figs. 2 through 8, which are vector diagrams of signals present in the circuit of Fig. 1.

Figure 2:
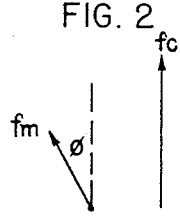
Figs. 2 through 8 are vector diagrams of signals present in the circuit of Fig. 1.
Figure 4:
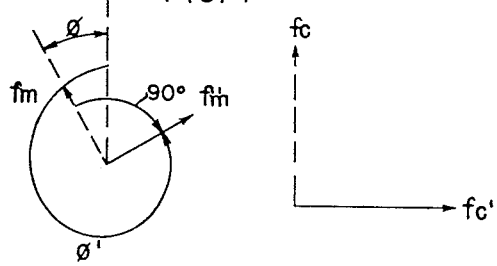
Figure 5:
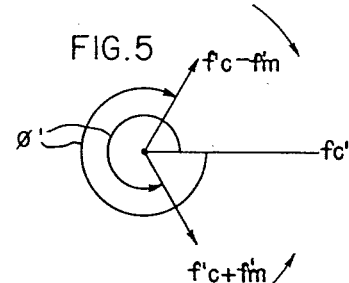

Suppose now that a signal $f_c$ is applied to transformer 10 and a signal $f_m$ is applied to transformer 14. Suppose further that the vector $f_c$ of Fig. 2 represents the signal $f_c$ applied at the input of tube 24 and that vector $f_m$ making an angle $\phi$ with a vertical reference line represents the signal $f_m$ applied to the input of tube 24. The signal at the anode of tube 24 may now be represented by the system of vectors shown in Fig. 3. At a particular instant of time the vector $f_c$ represents the amplitude and phase of the signal $f_c$ and the two oppositely rotating vectors $f_c+f_m$ and $f_c-f_m$ represent the upper and lower sidebands, respectively. These two vectors will be displaced by equal angles $\phi$ from vector $f_c$, and the angular velocity of these two vectors with respect to the vector $f_c$ is proportional to the frequency $f_m$. Fig. 4 represents in vector form the signals $f_m'$ and $f_c'$ that are applied to the control grid of tube 26. Since the impedance of capacitor 36 was made equal to that of resistor 34 and the impedance of capacitor 44 was made equal to that of resistor 46, the vector $f_c'$ of Fig. 4 will lag 90 degrees behind the vector $f_c$ of Fig. 2. At the same time resistor 18 may be adjusted so that the vector $f_m'$, Fig. 4, lags 90 degrees behind the vector $f_m$ of Fig. 2. The vector $f_m'$ makes an angle $\phi'$ with the vertical reference line. Fig. 5 is a vector diagram of the output of tube 26 at the same time as that represented in Fig. 3. The vector $f_c'$ represents the signal $f_c'$ and vectors $f_c'+f_m'$ and $f_c'-f_m'$ represent the upper and lower sidebands. These two last mentioned vectors rotate in opposite directions with respect to vector $f_c$ and at this instant make an angle of $\phi'$ with vector $f_c'$.

Figure 3:
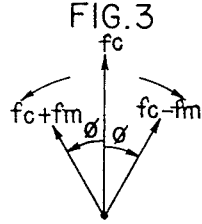
Figure 6:
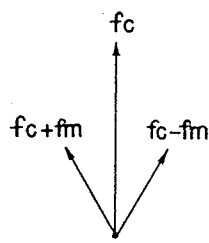
Figure 6:
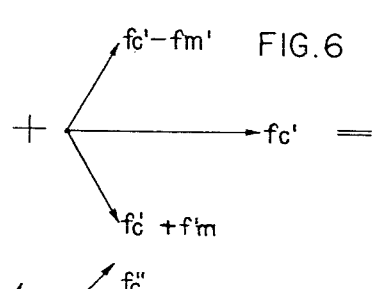
Figure 7:
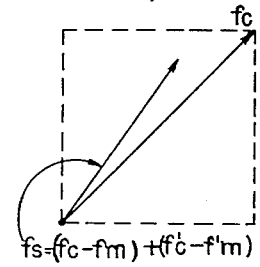
Figure 7:
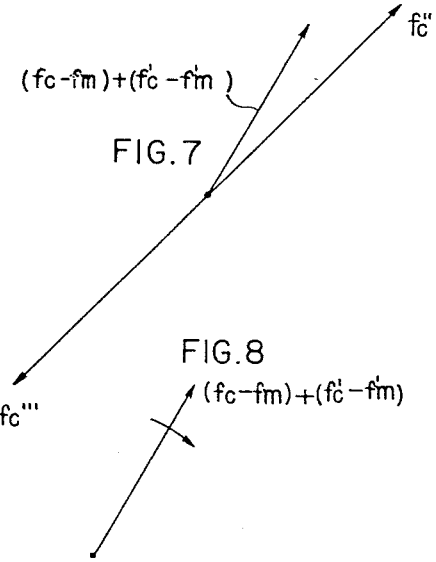

Since the outputs of tubes 24 and 26 are added vectorially in the tuned circuit comprising coil 68 and capacitor 72, the vector diagrams of Fig. 3 and Fig. 5 may be added to obtain the net output from tubes 24 and 26. Fig. 6 is a series of vector diagrams representing this addition. Since vectors $f_c+f_m$ and $f_c'+f_m'$ represent signals of the same amplitude and frequency but are in phase opposition the sum of these two signals will be zero. If these two signals are not equal in amplitude, they may be made so by adjusting potentiometers 16 and 22. In a similar manner vectors $f_c-f_m$ and $f_c'-f_m'$ represent two signals of the same frequency and amplitude and in phase with each other. The sum of these two vectors is a vector rotating at a frequency equal to that of the vectors $f_c-f_m$ and $f_c'-f_m'$ but twice the amplitude of either. The vector $f_c''$ represents the vector sum of vectors $f_c$ and $f_c'$. Fig. 7 represents the addition of a vector $f_c'''$ to the resultant vectors of Fig. 6. The vector $f_c'''$ represents the amplitude and phase of a signal equal in frequency to signal $f_c$ at the output of tube 54. The amplitude of $f_c'''$ is adjusted by moving the tap on potentiometer 64 which changes the bias on tube 54, and the phase of signal $f_c'''$ is adjusted by means of capacitor 52. The output of tube 54 is added vectorially to the outputs of tubes 24 and 26 in the tuned circuit containing coil 68. Therefore, if the signal $f_c'''$ is made equal in magnitude but in phase opposition to signal $f_c''$ the net signal across coil 68 will be that signal represented by the vector $(f_c-f_m)+(f_c'-f_m')$, Fig. 8.

Figure 8:
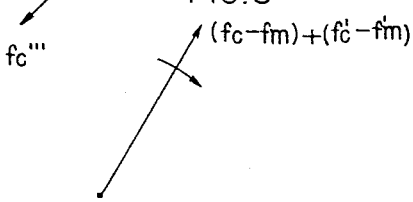

The vector of Fig. 8 represents a signal of a frequency equal to the difference in frequency between signals $f_c$ and $f_m$. If signal $f_c$ has a frequency of 100,000,000 cycles per second and signal $f_m$ has a frequency of 100 cycles per second, the signal appearing across coil 68 and hence at terminal 88 will be a signal of 99,999,900 cycles. The percentage difference in frequency between the two signals or either signal and either sideband makes no difference in the operation of this circuit because no tuned circuits are employed to separate signals of different frequencies.

If it is desired to obtain the upper sideband or, in this case, a signal of 100,000,100 cycles per second, the position of capacitor 20 and resistor 18 may be interchanged so that the signal $f_m'$ leads signal $f_m$ by 90 degrees. If potentiometers 16 and 22 are oppositely ganged as stated above, complete or incomplete cancellation of the unwanted side may be obtained as desired. In a similar manner complete or incomplete cancellation of the signal $f_c$ may be obtained by adjusting capacitor 52 and potentiometer 64.

Figure 9:
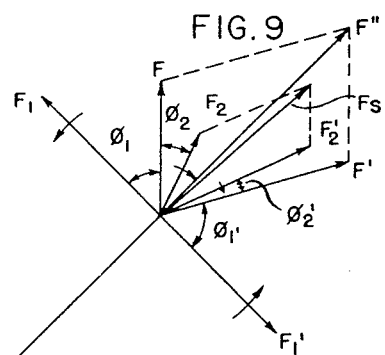
Fig. 9 is a vector diagram of a more general case than that illustrated in Figs. 2 through 8.

In Fig. 9 a broader aspect of the invention is illustrated. The analysis to this point has assumed that perfectly equal and symmetrical sidebands are attainable. Also, the carrier of the two modulated signals have been considered to be at a 90° angle to each other. The former condition is not perfectly attainable in practice. Neither condition is essential to theoretically perfect results. Vector F represents for example the received signal voltage from a device to be tested. Vectors $F_1$ and $F_2$ represent sidebands of vector F, unequal in magnitude and unsymmetrical to vector F as they may be in practice. A carrier F' the frequency of which equals that of vector F but which is displaced therefrom by other than 90° is modulated by a signal frequency equal to the difference between vector F and its sidebands. Before the two modulated signals are combined, the unwanted sidebands $F_1$ and $F_1'$ must be made equal in magnitude and opposite in phase. Even if the sidebands $F_2$ and $F_2'$ of the desired frequency are then not in phase, they will in all probability yield a desired resultant $F_3$. The resultant F'', of carrier frequency, may readily be eliminated by an equal and opposite voltage F'''.

Regardless of the specific equipment designed for accomplishing the proposed method of signal generation, that method yields a signal which is stable in frequency relative to the given signal, and which avoids the tendency characteristic of simple oscillators to lock in with associated equipment operating at a nearly equal frequency. By providing an entirely electrical unit, the shortcomings and the limitations as to operating frequency range and range of frequency difference, limitations characteristic of alternative signal generators involving driven parts, are avoided.

The system described may be constructed using lumped, adjustable components 10, 12, 34, 36, 44, 46, 68, 72, 50, and 52 for frequencies up to a few hundred megacycles and may be adapted with known U. H. F. components to higher frequencies. The RC phase-shifting devices 34, 36, 44, 46, 50 and 52 are here shown as energized from a single coil, but it is evident that multiple coil secondaries may alternatively be used, one for each phase shifter. The circuit shown is both simpler and more dependable. Also, with sacrifice of simplicity tube 54 may be omitted and tubes 24 and 26 replaced by two balanced modulator circuits to suppress the carrier frequency in each channel.

In this embodiment of the invention the desired results are attained by first mutually shifting the modulation signals and the carriers for the two channels and then modulating the carrier. The same result may be obtained if the modulation signal components are mutually shifted before modulation as shown, and the circuit is modified so that the entire modulated signals are mutually shifted in phase before they are combined. In that event no phase shifters (34, 36 and 44, 46) may be required for the components of the carrier signal supplied to the two channels. Phase shifters for the modulated signals would be required in their place.

As a further feature of the invention, where a given signal has multiple, reasonably close frequency components and it is impressed on the circuit in Fig. 1, the respective frequency components will all be shifted by the substantially same amount, with appropriate circuit design. Where the multiple frequency components deviate materially from that for which the cancellation is designed, the cancellation of some of the original frequency components in the output will be imperfect but effective.

The embodiment of the invention shown may be used to test certain radio altimeters. These altimeters emit a signal whose frequency is modulated to rise and fall at a constant rate, periodically reversing. The reflected wave also rises and falls in frequency, with a time lag. At any instant there is a frequency difference between the emitted and reflected waves that represents altitude. The sign of the difference is successively positive and negative. Since the altimeter is responsive alike to equal frequency differences of opposite sign, a sustained frequency difference of one sign as provided by the generator will simulate the reflected wave, to cause substantially the same altimeter reading as a reflected wave of equal frequency difference.

While there has been described what is at present considered the preferred embodiment of the invention, it will be obvious to those skilled in the art that various changes and modifications may be made therein without departing from the invention.

What is claimed is:

1. A single sideband modulator circuit comprising a first tuned transformer for introducing a first signal, a first and a second phase shifter connected to a first and a second half of the output of said transformer for providing a second and a third signal in phase quadrature, a third phase shifter connected to the entire output of said tuned transformer for providing a fourth signal mutually shifted in phase with respect to the three above mentioned signals, a second transformer means for introducing a fifth signal, a fourth phase shifter connected to the output of said second transformer for providing a sixth signal mutually shifted in phase with respect to said fifth signal, first and second potentiometer means for adjusting the amplitudes respectively, of said fifth and said sixth signals, a first vacuum tube modulator circuit providing means for modulating said second signal with said fifth signal, a second vacuum tube modulator circuit providing means for modulating said third signal with said sixth signal, a vacuum tube amplifier circuit providing means for amplifying said fourth signal, means for controlling the gain of said amplifier circuit and means for combining the outputs of said first modulator circuit, said second modulator circuit and said amplifier circuit in a common impedance whereby the amplitude of a seventh signal having the same frequency as said first signal, an eighth signal having a frequency equal to the sum of the frequencies of said first signal and said fifth signal and a ninth signal having a frequency equal to the difference of the frequencies of said first signal and said fifth signal may be selectively and individually varied in amplitude through a range of values including zero.

2. Apparatus for developing a signal having a desired frequency-difference relative to a signal of given frequency, comprising means producing mutually phase-shifted components of a modulation signal the frequency of which equals said frequency difference, means including three channels for producing said signal of given frequency in said three channels phase shift means in at least two of said channels for separately shifting the phase of said signal of given frequency, means in said two of said three channels for modulating said given frequency with a respective component of said modulation signal means combining the modulated signals of said two channels in such phase and proportion that the unwanted sidebands are cancelled, and means combining the modulated signals of said two channels and the signal of given frequency of said third channel in such phase and proportion that the third channel signal of given frequency cancels the resultant of the given-frequency components of said modulated signals.

3. The method of developing a signal having a desired frequency-difference relative to a signal of given frequency, which comprises the steps of providing a pair of mutually phase-shifted components of a modulation signal the frequency of which equals said frequency-difference, separately modulating each of a pair of given-signal components with a respective one of said modulation components, combining the modulated signals in such phase and proportion that the unwanted sidebands are mutually substantially cancelling, and eliminating the carrier components of the modulated signals by combining them with a third component of said given signal which is of equal amplitude and opposite phase to the resultant of said carrier components, the resultant of the remaining sideband components being the desired signal.

4. The method of developing a signal having a desired frequency difference relative to a signal of given frequency which comprises the steps of generating a pair of mutually phase shifted components of a modulation signal, the frequency of which equals said frequency difference, said mutual phase shift being any angle other than 180 degrees or multiples thereof, generating a pair of mutually phase shifted components of said given frequency signal, the mutual phase shift of said given frequency signal components equalling 180 degrees minus the mutual phase shift of said modulation signal frequency components, modulating each given frequency signal component with a respective one of said modulation frequency components, combining the modulated signals with such relative amplitudes thereof that one of the side band frequencies of the modulated signals is cancelled, and eliminating the given frequency signal components of the modulated signals by combining them with a third component of said given frequency signal which is of equal amplitude and opposite phase to the resultant of said given frequency signal components.

5. A single side band modulation circuit comprising means providing a carrier frequency signal in three channels, means providing a modulating frequency signal in the first and second of said channels, first modulator means in the first of said channels for modulating said carrier frequency signal with said modulation frequency signal to produce sideband frequency and carrier frequency components, phase shift means in the second of said channels for separately shifting the phases of said modulation frequency signal and said carrier frequency signal so that the sum of the phase shift equals 180 degrees, second modulator means connected to said phase shift means for modulating said phase shifted carrier frequency signal with said phase shifted modulation frequency signal to produce sideband frequency and carrier frequency components, mixer means connected to receive the outputs of said first and second modulator means, means for adjusting the relative amplitudes of said outputs so that one sideband frequency component is cancelled. and means in the third of said channels connected to said mixer for shifting the phase and adjusting the amplitude of said carrier frequency signal in said third channel so that it will cancel the resultant of the carrier frequency components of the outputs of said first and second modulators.

RUSSELL R. YOST, Jr.

REFERENCES CITED

The following references are of record in the file of this patent:

UNITED STATES PATENTS

| Number | Name | Date |
|---|---|---|
| 1,744,044 | Green | Jan. 21, 1930 |
| 2,163,719 | Usselman | June 27, 1939 |
| 2,173,145 | Wirkler | Sept. 19, 1939 |